United States Patent [19]

Honda

[11] Patent Number: 5,834,395
[45] Date of Patent: Nov. 10, 1998

[54] CATALYST FOR CONTROLLING EMISSIONS

[75] Inventor: Takashi Honda, Tokyo, Japan

[73] Assignee: Next Generation Catalyst Research Institute, Co., Ltd., Japan

[21] Appl. No.: 613,284

[22] Filed: Mar. 11, 1996

[30] Foreign Application Priority Data

Mar. 24, 1995 [JP] Japan ..................................... 7-066125
Dec. 15, 1995 [JP] Japan ..................................... 7-327229

[51] Int. Cl.$^6$ ................................ B01J 23/70; B01J 8/02; B01J 29/06
[52] U.S. Cl. ......................... 502/346; 502/300; 502/304; 502/318; 502/325; 502/327; 502/334; 502/335; 502/336; 502/232; 502/237; 502/240; 502/241; 502/242; 502/244; 502/61; 502/64; 502/65; 423/213.2; 423/213.5; 423/239.2
[58] Field of Search ..................................... 502/346, 300, 502/304, 318, 325, 327, 334, 335, 336, 232, 237, 240, 241, 242, 244, 61, 64, 65; 423/213.2, 213.5, 239.2

[56] References Cited

U.S. PATENT DOCUMENTS

| | | | |
|---|---|---|---|
| 4,221,768 | 9/1980 | Inoue et al. | 423/239.1 |
| 4,261,862 | 4/1981 | Kinoshita et al. | 502/304 |
| 4,874,590 | 10/1989 | Staniulis et al. | 423/239 |
| 5,078,981 | 1/1992 | Kagawa et al. | 423/239.2 |
| 5,318,934 | 6/1994 | Ueoka et al. | 502/61 |
| 5,338,715 | 8/1994 | Iida et al. | 502/64 |
| 5,358,916 | 10/1994 | Shiokawa et al. | 502/65 |
| 5,462,905 | 10/1995 | Nagami et al. | 502/232 |
| 5,514,355 | 5/1996 | Eshita et al. | 423/239.2 |

*Primary Examiner*—Mark L. Bell
*Assistant Examiner*—Patricia L. Hailey
*Attorney, Agent, or Firm*—Gifford, Krass, Groh, Sprinkle, Patmore, Anderson & Citkowski, P.C.

[57] ABSTRACT

Catalyst for controlling emissions of the present invention is comprised of at least one kind of transition metal atoms and at least one of Al or Si, wherein said transition metal atoms form a part of the surface of the catalyst for purifying exhaust gas. Accordingly, the catalyst for purifying exhaust gas has both high performance for purifying $NO_x$ and high heat resistance, because monoatomic active metal disperses in the catalyst structure, active metal is taken firmly in the structure, and said transition metal forms a part of the surface of the surface.

13 Claims, 13 Drawing Sheets

CATALYST FOR CONTROLLING EMISSIONS

BACKGROUND OF THE INVENTION (1) Field of the Invention

The present invention relates to catalyst for controlling emissions which has high heat resistance and high performance for controlling $NO_x$ (nitrogen oxides).

(2) Description of the Prior Art

Ion exchanged zeolite catalysts and active metal supported catalysts have been known as catalysts for controlling $NO_x$ in the presence of excess oxygen such as exhaust gas of diesel or lean-burn engine.

Conventional active metal supported catalyst is prepared by impregnation by immersing support such as alumina in aqueous solution of metal salt. The supported active metal has a large particle size grain diameter (approximately 50 to 100 Å). It is believed that the smaller grain effective for activity. However, it is almost impossible to decrease the grain diameter, because growth or agglomeration of the active metal grain occurs during the dry process after impregnation process. The grain of the active metal sinters each other by heating, and the catalytic performance declines irreversively. Furthermore, the activity of the catalyst declines in the presence of water vapor.

The ion exchanged zeolite have ionic active metal at an ion exchange site and shows high performance for removing $NO_x$. However, the ions move easily by heat treatment and the performance for removing $NO_x$ declines irreversively, since the ion on the ion exchange site is unstable. The pore structure of the zeolite is collapsed at high temperatures, since the heat resistance of zeolite structure is low. Furthermore, the active metal ions move by de-alumination in the presence of water vapor, and the catalytic activity might change irreversively.

SUMMARY OF THE INVENTION

An object of the present invention is to provide a catalyst for purifying exhaust gas which has high activity performance for removing $NO_x$.

Another object of the present invention is to provide catalyst for purifying exhaust gas which has stable catalytic activity at high temperatures.

The catalyst for controlling emissions of the present invention the compound oxide which is comprised of at least one kind of transition metal atoms and at least one of Al or Si, wherein said transition metal atoms form a part of the surface of the catalyst for controlling emissions.

Accordingly, the catalyst for controlling emissions has both high performance for removing $NO_x$ and high heat resistance, because monoatomic active metal disperses in the catalyst structure, active metal is taken firmly in the structure, and said transition metal forms a part of the surface of the surface.

Furthermore, when autoclave process is done to this catalyst for controlling emissions by using water or alcohol, the performance for removing $NO_x$ goes up extremely because the crystal becomes stable and catalytic activity is encouraged on account of the special circumstance in the autoclave.

Especially, autoclave process under critical temperature, at which the crystal layer of compound oxide separates, forms a catalyst which has the best performance for removing $NO_x$.

The other catalyst for controlling emissions of the present invention is composed of the mixture of zeolite and one of alumina catalyst, silica catalyst and alumina compound catalyst.

Accordingly, the performance for removing $NO_x$ increases in the presence of water vapor, because the zeolite supplements the performance for removing $NO_x$. Furthermore, since zeolite to which ion exchange operation is not done is used, aluminum is hardly removed from the zeolite structure, and zeolite crystal is hardly collapsed. Therefore, the catalytic activity does not decline irreversively in the presence of water vapor.

DESCRIPTION OF THE PREFERRED EMBODIMENT

Example 1-1

Figure 1:
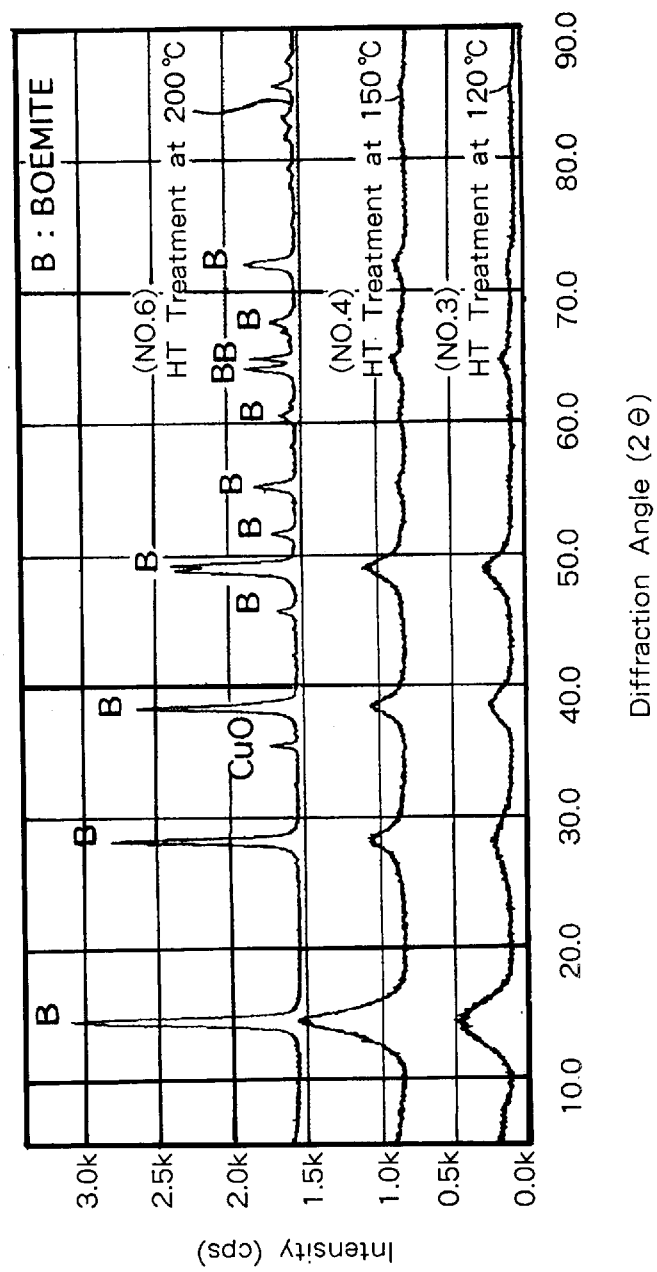
FIG. 1 is a graph showing XRD analysis of catalyst for controlling emissions after hydrothermal process of Example 1-1.

Preparation of Cu—Al compound oxide catalyst without autoclave treatment and with autoclave treatment using water:

An aqueous solution containing aluminum nitrate and copper nitrate was prepared so as to contain 5 wt % of copper oxide (CuO) on the oxide reduction basis.

With the solution being stirred, 0.5 to 3% diluted aqueous ammonia was slowly dropped into the solution, until the solution was neutralized to obtain a co-precipitate. A uniform mixture cannot be obtained, in case of an excess increased concentration of the solution, or rapid dropping of aqueous ammonia. Therefore, the concentration should not exceed 0.4 mol/liter, and the dropping speed should not exceed 10 cc/min. The produced co-precipitate was filtered and washed with purified water to obtain Cu—Al gel.

Using an autoclave, the obtained gel was subjected to hydrothermal treatment, dried in the atmosphere and then at 110 degree C. for a night, and thereafter milled using a mortar. The resulting powder was calcined at 700 degree C. for an hour to synthesize a desired compound oxide catalyst that is a hydrothermally treated emission catalyst.

In parallel thereto, the above prepared gel was dried and calcined as it was, without hydrothermal treatment, to prepare another catalyst.

Other than the Cu—Al gel without being hydrothermally treated, comparative examples were prepared in the following process.

That is, aluminum oxide without containing copper was prepared as gamma-$Al_2O_3$ by the aforementioned process. Then, an aqueous solution of copper nitrate was prepared, having a concentration containing 5 wt% of CuO relative to the amount of gamma-$Al_2O_3$ on the oxide reduction basis. The gamma-$Al_2O_3$ is immersed in the solution. Then, with the solution being stirred, 0.5 to 3% diluted aqueous ammonia solution was slowly added until the solution was neutralized to prepare a catalyst in the form that Cu was supported on gamma-$Al_2O_3$.

TABLE 1

| No. | Catalyst | CuO (wt %) | Hydrothermal Treatment Temp. °C. | Catalytic Activity | | |
|---|---|---|---|---|---|---|
| | | | | $NO_x$ Maxim. Conversion | HC Maxim. Conversion | CO Maxim. Conversion |
| 1a | CuO-supported alumina | 5 | — | 25.6% (464° C.) | 94.7% (549° C.) | 92.4% (600° C.) |
| 1b | CuO-supported alumina | 5 | 150 | 21.1% (470° C.) | 99.3% (562° C.) | 92.4% (613° C.) |
| 1 | Cu-Al compound oxide | 5 | — | 26.4% (467° C.) | 95.7% (650° C.) | 93.4% (600° C.) |
| 2 | Cu-Al compound oxide | 5 | 100 | 27.0% (432° C.) | 96.5% (632° C.) | 94.1% (595° C.) |
| 3 | Cu-Al compound oxide | 5 | 120 | 31.4% (413° C.) | 99.2% (499° C.) | 99.0% (550° C.) |
| 4 | Cu-Al compound oxide | 5 | 150 | 34.4% (448° C.) | 97.1% (550° C.) | 95.9% (630° C.) |
| 5 | Cu-Al compound oxide | 5 | 190 | 28.0% (511° C.) | 95.2% (623° C.) | 92.8% (636° C.) |
| 6 | Cu-Al compound oxide | 5 | 200 | 9.4% (525° C.) | 64.7% (640° C.) | 50.0% (640° C.) |

Specifically, as shown in Table 1, Nos. 1 to 6 were prepared so that each was Cu—Al compound oxide containing 5 wt % of CuO on the oxide reduction basis, and hydrothermally treated at 100, 120, 150 and 200 degree Centigrade, respectively, and the last was of not hydrothermally treated.

In addition, Comparative example Nos. 1b and 1a were those synthesized as CuO-supported alumina containing 5 wt% of CuO, the former being treated at 150 degree C., and the latter not hydrothermally treated.

Catalytic activity was measured by a conventional fixed-bed flow system under atmospheric pressure using a composition of reaction gas containing NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (gas hourly space velocity) being 200,000 $h^{-1}$.

All examples Nos. 1 to 5 exhibited the satisfactory catalytic activity of 30% as the maximum $NO_x$ conversion, and no $N_2O$ production was found. On the other hand, No. 6 exhibited $NO_x$ conversion as low as 10%, and its activity was clearly lowered.

Table 2 shows the result of thermal deterioration test of catalytic ability tested by the reaction at 800 degree C.

As shown, in the embodiments No. 1 and No. 4, almost no thermal deterioration in catalytic activity was found after thermal test for as long as 10 hours on $NO_x$, whereas an extreme thermal deterioration was found in the comparative example No. 1a of conventional type.

Thus, catalysts according to the invention are clearly improved in thermal stability.

The result of XRD (Powder X-ray diffraction pattern) analysis on the synthesized catalysts as embodiments Nos. 1, 2, 3, 4, 5 and 6 proved that the embodiments Nos. 3, 4 and 6 which were autoclave-treated had the pseudo-boemite crystal structure, resemble to amorphous phase, as an increased crystallinity was found in accordance with the rise of treatment temperature. However, with a raised temperature as high as 200 degree C., the boemite was extremely crystallized as seen in the embodiment No. 6. Also, in the case of No. 6, it was clearly proved that such an active metal (Cu), which was enclosed in the structure in No. 3 or 4, was freed and the crystal phase of CuO was separately present other than boemite phase. Therefore, it was proved that a raised autoclave temperature in excess would exceed the critical temperature which would cause separation of crystal phases.

Figure 2:
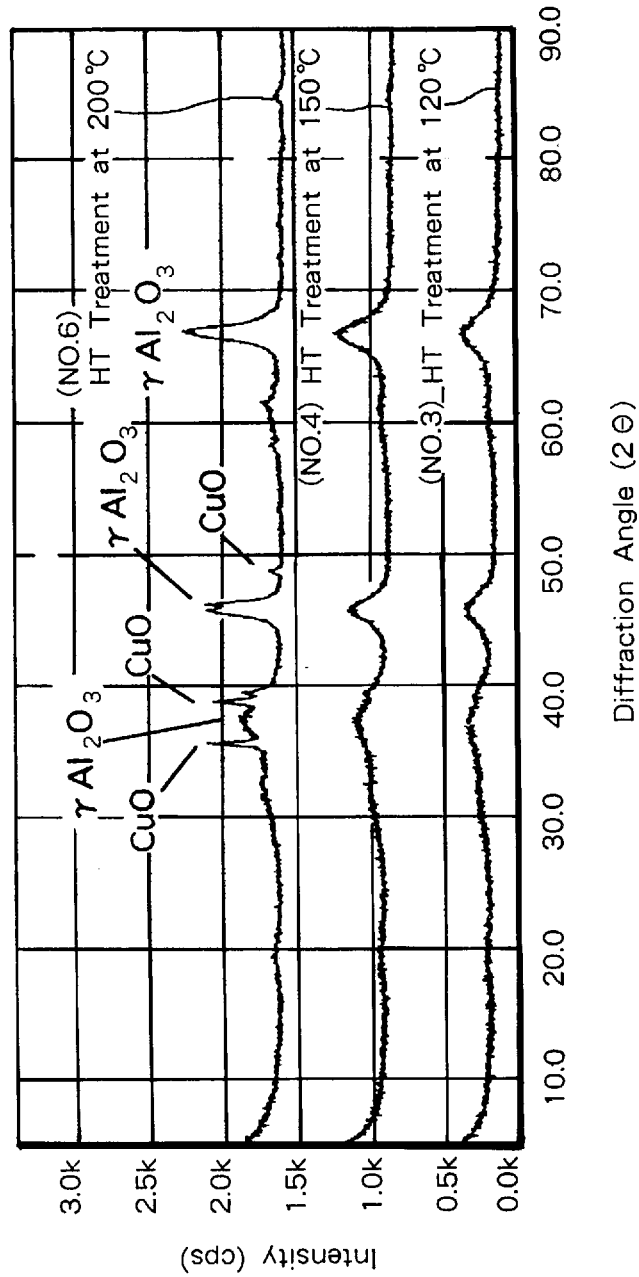
FIG. 2 is a graph showing XRD analysis of catalyst for controlling emissions after burning process at 700 degrees Centigrade of Example 1-1.

The embodiments No. 1, 2, 3, 4 and 5 were calcined at 700 degree C. in the atmosphere, and the result proved the phase thereof transferred to gamma-$Al_2O_3$ phase, but the active metal was merely captured in the structure, and there was no evidence of the presence of freed CuO. In the case of embodiments No. 6, the phase was transferred to gamma-$Al_2O_3$, but CuO which was already isolated at autoclave-treatment was still present, as shown in FIG. 2, it shows that the structure of embodiment No. 6 is not the same as that of the invention.

This shows that the autoclave-treatment is necessary to be carried out at the temperature not exceeding the critical temperature at which crystal phases would not separate.

Figure 3:
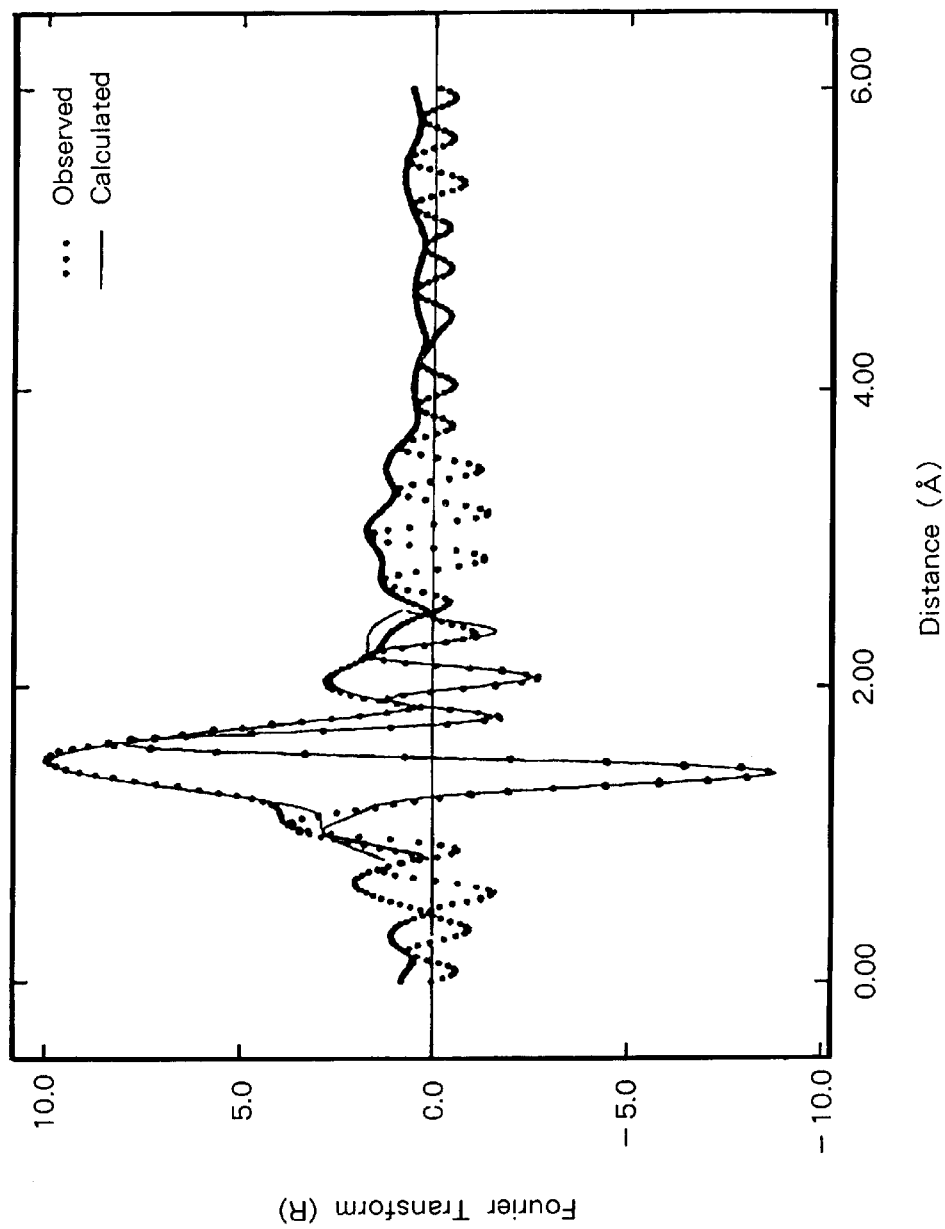
FIG. 3 is a graph showing EXAFS analysis of catalyst for controlling emissions after hydrothermal process at 150 degrees Centigrade of Example 1-1.
Figure 4:
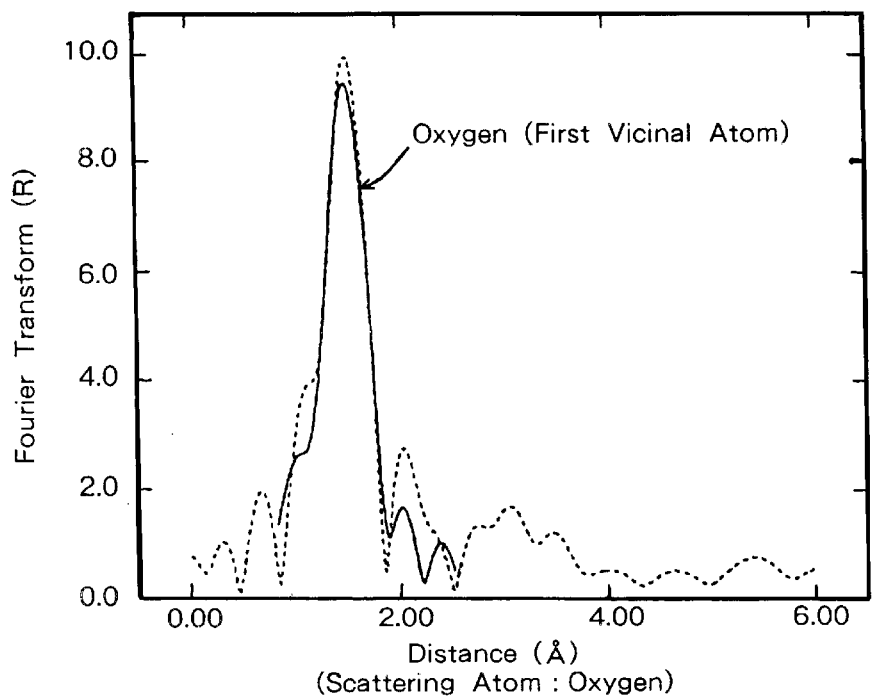
FIG. 4 is a graph showing EXAFS analysis of catalyst for controlling emissions after hydrothermal process at 150 degrees Centigrade of Example 1-1.
Figure 5:
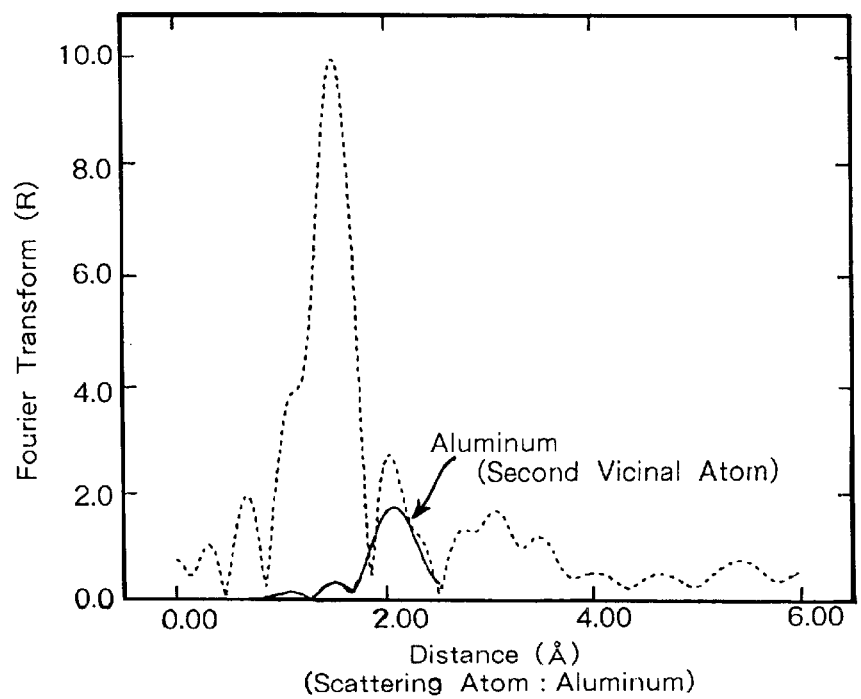
FIG. 5 is a graph showing EXAFS analysis of catalyst for controlling emissions after hydrothermal process at 150 degrees Centigrade of Example 1-1.

A local structural analysis of the active metal atoms by the Extended X-ray Absorption Fine Structure analysis (hereinafter, abbreviated as "EXAFS analysis") was performed on the compound oxides which were treated in the autoclave at appropriate temperatures, and the result thereof was obtained as shown in FIGS. 3, 4 and 5.

Each of FIGS. 3, 4 and 5 shows the Fourier transforms of the EXAFS spectra of Cu. The graph shows the real parts and imaginary parts of the Fourier transformation, the dotted symbols are observed spectra, solid lines show the results of calculation, the parameters of McKale were employed in the fitting procedure, and curve-fitting was executed in R space. The result proves the first vicinal atoms are oxygen, and the second vicinal atoms are aluminum. Further, it is also found from FIGS. 4 and 5, there are no Cu atoms, in the second vicinal atoms. Table 3 shows the result of curve-fitting.

This proves, in the case of the autoclave treatment at the temperature not exceeding the critical temperature of 190 degree C., the active metal highly disperses in the catalyst structure at the monoatomic level, and has firmly taken in the structure.

In the CuO supported alumina catalyst prepared by the conventional process, all the CuO molecules exist on the surface of the active alumina, and, in addition, form a cluster of 50 to 100 Ångstrom, wherein it is supposed as many as hundreds to thousands of atoms gather around an active metal particle. In contrast, in the catalyst of the invention, the active metal is highly dispersed in the catalyst structure, and has firmly taken in the structure, and the active metal itself forms a part of the surface. It is generally known that an atom existing as a single atom exhibits a different property from those exist as a cluster or a bulk having further increased size. It would be easily understood as to how useful for $NO_x$ conversion a single atom or the like state Cu is, reviewing the catalytic activity of the copper ion exchanged zeolite. The catalyst of the invention is, having a structure in which the highly dispersed active metal has firmly taken in the structure, thermally stable, having higher $NO_x$ conversion activity and thermal stability, and is suitable as a $NO_x$ removing catalyst from the exhaust gas of an automobile.

TABLE 2

Thermal Deterioration Test at 800° C.

| No. | Catalyst | $NO_x$ conversion after Hour(s) (hours) | | | | | |
|---|---|---|---|---|---|---|---|
| | | 0 | 2 | 4 | 6 | 8 | 10 |
| 4 | Cu-Al compound oxide (CuO 5 wt %, 150° C.) | 34.4% | 34% | 34% | 34% | 34% | 34% |
| 1 | Cu-Al compound oxide (CuO 5 wt %) | 26.4% | 23% | 25% | 24% | 24% | 24% |
| 1a | CuO-supported alumina CuO 5 wt % | 26.6% | 26% | 10% | 8% | 7% | 6% |

TABLE 3

| | First Vicinal Atom | Second Vicinal Atom |
|---|---|---|
| Existing Atom | Oxygen | Aluminum |
| Coordination Number | 2.8 | 0.5 |
| Distance (R(A)) | 1.9 | 2.5 |

Example 1-2

Preparation of Cu—Al compound oxide catalyst without autoclave treatment and with autoclave treatment using water:

An aqueous solution containing aluminum nitrate and copper nitrate was prepared so as to contain 15 wt % of copper oxide (CuO) on the oxide reduction basis.

With the solution being stirred, 0.5 to 3% diluted aqueous ammonia of was slowly dropped into the solution, until the solution was neutralized to obtain a co-precipitate. A uniform mixture cannot be obtained, in case of an excess increased concentration of the solution, or rapid dropping of aqueous ammonia. Therefore, the concentration should not exceed 0.4 mol/liter, and the dropping speed should not exceed 10 cc/min. The produced co-precipitate was filtered and washed with purified water to obtain Cu—Al gel.

Using an autoclave, the obtained gel was subjected to hydrothermal treatment, dried in the atmosphere and then at 110 degree C. for a night, and thereafter milled using a mortar. The resulting powder was calcined at 700 degree C. for an hour to synthesize a desired compound oxide catalyst that is hydrothermally treated, emission catalysts Nos. 8 and 9.

The above prepared Cu—Al gel was dried and calcined to prepare No. 7. In parallel thereto, a comparative catalyst No. 2a was prepared in the process: Al oxide without containing Cu was prepared in the same process as above to prepare gamma-$Al_2O_3$, which was immersed in aqueous copper nitrate solution so as to contain 15% of CuO on the oxide reduction basis; and, to the mixed solution 0.5 to 3% diluted aqueous ammonia was added by stirring. Thus, No. 2a was prepared.

The catalytic activity was given by using conventional fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$:6%, $CO_2$: 10%, $H_2O$: 10%, CO: 10% and $N_3$: %, and GHSV was performed with 200,000 $h^{-1}$.

As the result shown in Table 4, the improvement of $NO_x$ conversion as 31% maximum was found, and no generation of $N_2O$ was found. No. 9 was autoclave-treated at 200 as the temperature higher than the critical point where the compound crystals were separated, and therefore the reduction ability was lowered.

TABLE 4

| | | | Catalytic Activity | | |
|---|---|---|---|---|---|
| No. | Catalyst | CuO (wt %) | Hydrothermal Treatment Temp. °C. | $NO_x$ Maxim. Conversion | HC Maxim. Conversion | CO Maxim. Conversion |
| 2a | CuO-supported umina | 15 | — | 11.8% (389° C.) | 99.2% (551° C.) | 100% (551° C.) |
| 7 | Cu-Al compound oxide | 15 | — | 26% (533° C.) | 75.2% (612° C.) | 66.1% (600° C.) |
| 8 | Cu-Al compound oxide | 15 | 150 | 34% (412° C.) | 99.6% (550° C.) | 99.8% (640° C.) |
| 9 | Cu-Al compound oxide | 15 | 200 | 7% (541° C.) | 62.1% (645° C.) | 52.2% (642° C.) |

Example 2

Synthesis of Cu—Al compound oxides with non-autoclave treatment and autoclave treatment A mixed solution of ethanol and purified water in the ratio of 1:5 containing aluminum nitrate and copper nitrate was prepared so as to contain 5 wt % of CuO on the oxide reduction basis. With the solution being stirred, 0.5 to 3% diluted aqueous ammonia was slowly dropped, until the solution was neutralized to obtain a co-precipitate, which has then filtered with a solution of 1:1 of ethanol and purified water, and further washed with solely ethanol to obtain Cu—Al gel.

Then, the gel was treated at temperatures between 100 and 200 degree Centigrade in the autoclave, dried in atmospheric air, and then dried at 110 degree Centigrade for a night, and thereafter milled using a mortar. The obtained powder was calcined at 700 degree Centigrade for an hour to synthesize the hydrothermally treated compound oxide catalyst.

Also, another catalyst No.10 containing Cu—Al gel which was prepared as above was prepared, but which was not subjected to hydrothermal treatment.

Also, still another catalyst was synthesized, through the process using aluminum oxide (in the form of gamma-$Al_2O_3$) without containing Cu, so that CuO was carried by such $Al_2O_3$, by the reaction in pure water/etalnol solution.

More specifically, the Example includes prepared catalyst items Nos. 11 to 14 and 10, all being Cu—Al compound oxide containing 5 wt % of CuO, but autoclave-treated at the different temperatures, 100, 120, 150 and 200 degree Centigrade, respectively: and the remaining one No. 10 was not autoclave-treated.

Further, Comparative examples Nos. 3b and 3a were prepared as follows. Aluminum oxide without containing Cu was prepared in the process same as above in the form of gamma-$Al_2O_3$.

Then, a mixed solution of ethanol and purified water in the ratio of 1:5 contain copper nitrate was prepared: having concentration containing 5 wt % of CuO relative to the amount of gamma-$Al_2O_3$ on the oxide reduction basis.

The gamma-$Al_2O_3$ was immersed in the solution.

Then, with the solution being stirred, 0.5 to 3% diluted aqueous ammonia solution was slowly added until the solution was neutralized to prepare a catalyst in the form that Cu was supported on gamma-$Al_2O_3$. After being filtered, the product was washed, dried and calcined also as above, and thereafter autoclave-treated at 150 degree Centigrade to form No. 3b and, separately, No. 3a were obtained without autoclave-treatment.

A measurement of $NO_x$ conversion was carried out by a conventional fixed-bed flow system under atmospheric pressure NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (space velocity) being 200,000 $h^{-1}$.

As found by Table 5, the maximum $NO_x$ conversion of 29% was obtained with 5% of Cu content. No formation of $N_2O$ is recognized.

Among the Examples, the result of lowered $NO_x$ conversion was found at elevated temperature, such as 200 degree Centigrade, of autoclave treatment.

Accordingly, the satisfactory results for all the conversion items were found in the cases of Nos. 11 to 13, subjected to autoclave treatment at the temperature not exceeding the critical point.

TABLE 5

| No. | Catalyst | CuO (wt %) | Autoclave Treatment Temp. °C. | $NO_x$ Maxim. Conversion | HC Maxim. Conversion | CO Maxim. Conversion |
|---|---|---|---|---|---|---|
| 3a | CuO-supported alumina | 5 | — | 12.6% (401° C.) | 97.4% (550° C.) | 98.4% (600° C) |
| 3b | CuO-supported alumina | 5 | 150 | 12.1% (450° C.) | 98.4% (500° C.) | 99.6% (550° C.) |
| 10 | Cu-Al compound oxide | 5 | — | 20% (452° C.) | 93.1% (553° C.) | 92.2% (623° C.) |
| 11 | Cu-Al compound oxide | 5 | 100 | 22.4% (457° C.) | 94% (574° C.) | 94.3% (645° C.) |
| 12 | Cu-Al compound oxide | 5 | 120 | 23% (465° C.) | 94.4% (586° C.) | 96.5% (679° C.) |
| 13 | Cu-Al compound oxide | 5 | 150 | 25.8% (488° C.) | 96.5% (599° C.) | 98.4% (700° C.) |
| 14 | Cu-Al compound oxide | 5 | 200 | 8.2% (458° C.) | 86.9% (651° C.) | 97.4% (669° C.) |

Example 3
Synthesis of Al-compound oxide containing Co, Ni, Fe

Each of solution of cobalt nitrate, nickel nitrate and iron nitrate was prepared so as to contain 5 wt % of oxide on the oxide reduction basis. By the same process in Example 1, a compound oxide catalyst was synthesized by non-autoclave-treatment. Separately, other compound oxide catalysts were prepared with autoclave-treatment at each temperature as in Example 1, respectively, resulting in Nos. 15, 16 and 17.

For all of these compound oxides, satisfactory conversion activity was found to e achieved not only by non-autoclave treatment but also by autoclave-treatment at not exceeding 190 degree Centigrade.

In addition, the result of measurement of $NO_x$ conversion activity by the method as in Example 1 is shown in Table 6. and extremely stable $NO_x$ conversion effect is found.

TABLE 6

| No. | Catalyst | Active metal content (wt %) | $NO_x$ Maxim. Conversion (non-autoclave treatment) | $NO_x$ Maxim. Conversion (autoclave treatment at 150° C.) |
|---|---|---|---|---|
| 15 | Co-Al compound oxide | 5 | 27.4% | 35.2% |
| 16 | Ni-Al compound oxide | 5 | 26.2% | 33.3% |
| 17 | Fe-Al compound oxide | 5 | 26.5% | 32.1% |

Example 4
Synthesis of Cu—Al—Si compound oxide with non-autoclave treatment and autoclave treatment Through the same process in Example 1, an aqueous solution containing aluminum nitrate, copper nitrate and water glass was prepared so as to contain 5 wt % of CuO and 10 wt % of $SiO_2$ on the oxide reduction basis.

With the solution being stirred, 0.5 to 3% diluted aqueous ammonia was slowly dropped, until the solution was neutralized to obtain a co-precipitate. At this time, with an excess concentration of the solution, or rapid dropping of aqueous ammonia, a uniform mixture on the atomic level cannot be obtained.

Therefore, the concentration should not exceed 0.4 mol/liter, and the speed of dropping should not exceed 10 cc/min. The produced co-precipitate was filtered and washed with purified water to obtain Cu—Al—Si gel.

The gel was hydrothermally treated using an autoclave at the temperature not exceeding 200 degree Centigrade, dried in atmospheric air and further at 110 degree Centigrade for a night, and thereafter milled using a mortar. The obtained powder was calcined at 700 degree Centigrade for an hour to synthesize the hydrothermally treated compound oxide catalyst, numbered as No. 19 to No. 23.

In parallel thereto, another sample, wherein the Cu—Al—Si gel was simply dried and calcined, without subjected to hydrothermal treatment, was prepared, and numbered as No. 18.

Further, Comparative examples Nos. 4a and 4b were also synthesized by preparing Al—Si oxide without containing copper, to which CuO is allowed to be supported.

A measurement of $NO_x$ conversion was carried out by a reaction apparatus with a fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: bal and GHSV (gas hourly space velocity) being 200,000 $h^{-1}$.

As found by Table 7, the maximum $NO_x$ conversion of 30% was obtained. No formation of $N_2O$ is recognized.

As found by Table 7, hydrothermal treatment at 200 degree Centigrade is not preferable, because such a temperature already exceeds the critical point and the $NO_x$ conversion is lowered.

Although co-precipitation synthesis was described, any other method, for example, alkoxide method can be applied: by applying such a method, a state that active transient metal atoms are not present within the range around the second vicinal atoms, thereby advantageously increasing the contact ability as well as thermal stability.

Also, for autoclave treatment, any liquid may be used other than water or alcohol.

Further, as to the oxide content of the catalyst, any other amount other than 5 or 15 wt % as CuO content on the reduction basis may be selected.

TABLE 7

| No. | Catalyst | CuO (wt %) | Hydro-Thermal Treatment Temp. °C. | $NO_x$ Maxim. Conversion | HC Maxim. Conversion | CO Maxim. Conversion |
|---|---|---|---|---|---|---|
| 4a | CuO-supported alumina silica | 5 | — | 21.0% (434° C.) | 94.2% (512° C.) | 90.3% (574° C.) |
| 4b | CuO-supported alumina silica | 5 | 150 | 18.3% (447° C.) | 98.1% (532° C.) | 98.5% (596° C.) |
| 18 | Cu-Al-Si compound oxide | 5 | — | 22.1% (436° C.) | 95.0% (531° C.) | 91.6% (581° C.) |
| 19 | Cu-Al-Si compound oxide | 5 | 100 | 23.0% (431° C.) | 96.8% (528° C.) | 94.2% (576° C.) |
| 20 | Cu-Al-Si compound oxide | 5 | 120 | 26.9% (427° C.) | 98.8% (511° C.) | 98.5% (564° C.) |
| 21 | Cu-Al-Si compound oxide | 5 | 150 | 28.7% (433° C.) | 98.2% (532° C.) | 97.2% (591° C.) |
| 22 | Cu-Al-Si compound oxide | 5 | 190 | 23.2% (481° C.) | 94.1% (532° C.) | 96.2% (594° C.) |
| 23 | Cu-Al-Si compound oxide | 5 | 200 | 8.4% (496° C.) | 60.1% (542° C.) | 45.3% (603° C.) |

Example 5

(1) Synthesis of mixed catalyst containing zeolite and alumina compound catalyst A solution of mixture of aluminum nitrate and copper nitrate was prepared so as to contain 1 to 50 wt % of copper on the oxide reduction basis. Into the solution, being gently stirred, aqueous ammonia solution diluted to 0.5 to 3% was slowly added until the solution was neutralized to obtain a co-precipitate. The co-precipitate was filtered with purified water to obtain Cu—Al gel. The gel was dried in the natural air further dried for a night at 110 degree Centigrade. The product was milled using a mortar to obtain powder. The powder was calcined at 700 degree Centigrade for an hour to synthesize alumina compound catalyst (CuAlO).

The alumina compound catalyst and non-ion exchanged zeolite (Na type ZMS-5) ($SiO_2/Al_2O_3$=23.8) are mixed in a mortar at a weight ratio 50:50 to obtain a mixed catalyst (CuAlO/NaZSM5).

(2) Performance Test for the mixed catalyst

Figure 6:
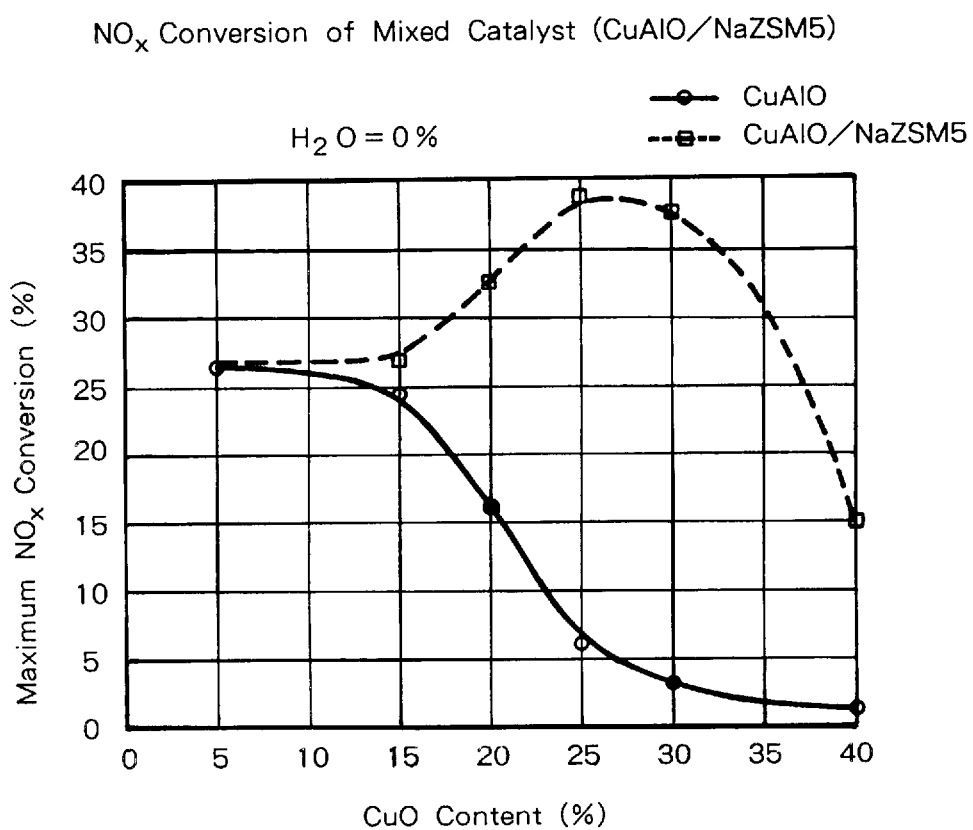
FIG. 6 is a graph showing the conversion of $NO_x$ of catalyst for controlling emissions of Example 5 in case $H_2O$ is 0%.
Figure 7:
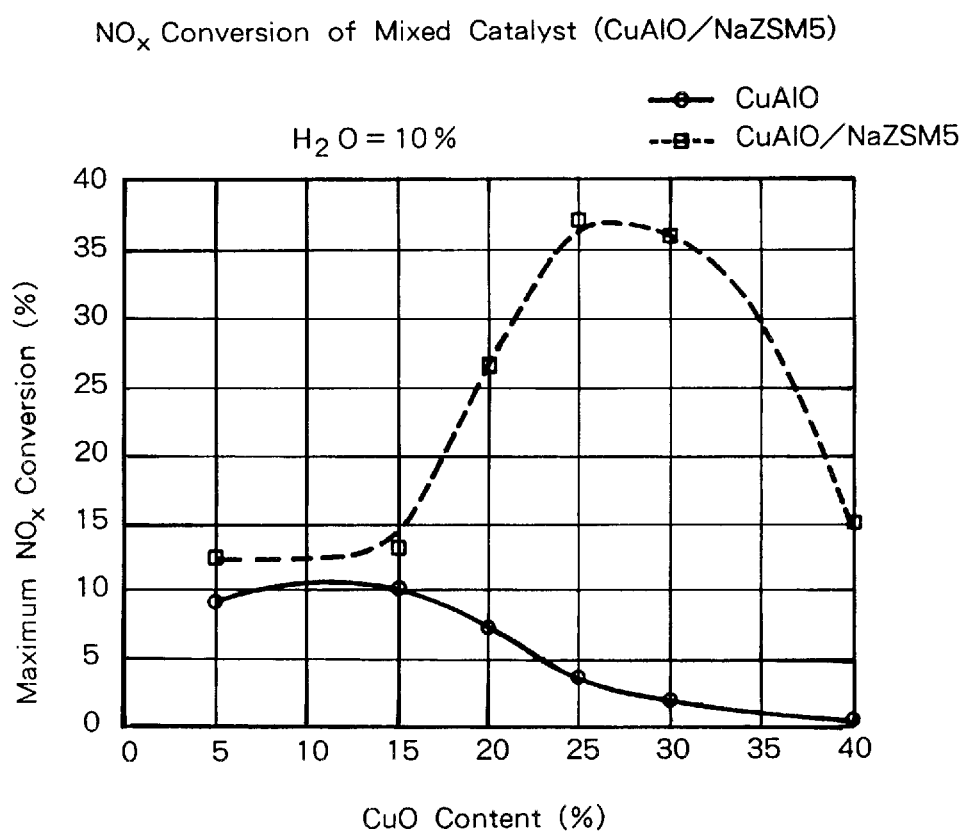
FIG. 7 is a graph showing the conversion of $NO_x$ of catalyst for controlling emissions of Example 5 in case $H_2O$ is 10%.

A measurement of $NO_x$ conversion was carried out by a fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (gas hourly space velocity) being 200,000 $h^{-1}$. No formation of $N_2O$ is recognized. Table 8 with FIG. 6, and Table 9 with FIG. 7 show the result of the performance test. FIG. 6 shows the data of Table 8, and FIG. 7 that of Table 9 by its graph, respectively.

TABLE 8

$NO_x$ Conversion of Mixed Catalyst (CuO/NaZSM5) at $H_2O$ = 0%

| No. | CuO content (%) | CuAlO (%) | CuAlO/NaZSM5 (%) |
|---|---|---|---|
| 0 | 5.000 | 26.400 | 26.820 |
| 1 | 15.000 | 24.490 | 26.940 |
| 2 | 20.000 | 16.400 | 32.400 |
| 3 | 25.000 | 6.3400 | 38.770 |
| 4 | 30.000 | 2.9800 | 37.550 |
| 5 | 40.000 | 1.2500 | 15.140 |

TABLE 9

$NO_x$ Conversion of Mixed Catalyst (CuO/NaZSM5) at $H_2O$ = 10%

| No. | CuO content (%) | CuAlO (%) | CuAlO/NaZSM5 (%) |
|---|---|---|---|
| 0 | 5.000 | 9.0400 | 12.310 |
| 1 | 15.000 | 10.100 | 13.200 |
| 2 | 20.000 | 7.5000 | 26.800 |
| 3 | 25.000 | 3.4000 | 37.250 |
| 4 | 30.000 | 2.0400 | 26.250 |
| 5 | 40.000 | 0.6300 | 14.800 |

(3) Performance Evaluation for the mixed catalyst

Exceeding 15 wt % (on oxide reduction basis) in copper content of alumina compound catalyst results in mixture effect of zeolite. It seems to indicate the dependence of aluminum and copper portion on the CuAlO surface on the activity.

Around 25 wt % both a selective reduction of $NO_x$ appears most expediently and water affects least. Further, a mixed oxide catalyst containing other transition metal (refer to Tokugan Hei 7-66125) or silica can provide similar mixture effect.

Example 6

(1) Synthesis of mixed catalyst containing zeolite and alumina catalyst

Gamma-$Al_2O_3$ was prepared by Al oxide not containing copper. A solution of mixture of copper nitrate was prepared so as to contain 1 to 50 wt % of CuO on the oxide reduction basis on gamma-$Al_2O_3$. Into the solution entering gamma-$Al_2O_3$, being stirred, aqueous ammonia solution diluted to 0.5 to 3% was slowly added until the solution was neutralized to obtain aluminum catalyst supporting copper to gamma-$Al_2O_3$ (CuO-gamma-AP). The alumina catalyst and non-ion exchanged zeolite (Na type ZSM-5) ($SiO2/Al_2O_3$= 23.8) are mixed in a mortar at a weight ratio 50:50 to obtain a mixed catalyst (CuAlO/NaZSM5).

(2) Performance Test for the mixed catalyst

A measurement of $NO_x$ conversion was held by a fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (space velocity) being 200,000 $h^{-1}$. No formation of $N_2O$ is recognized.

Figure 8:
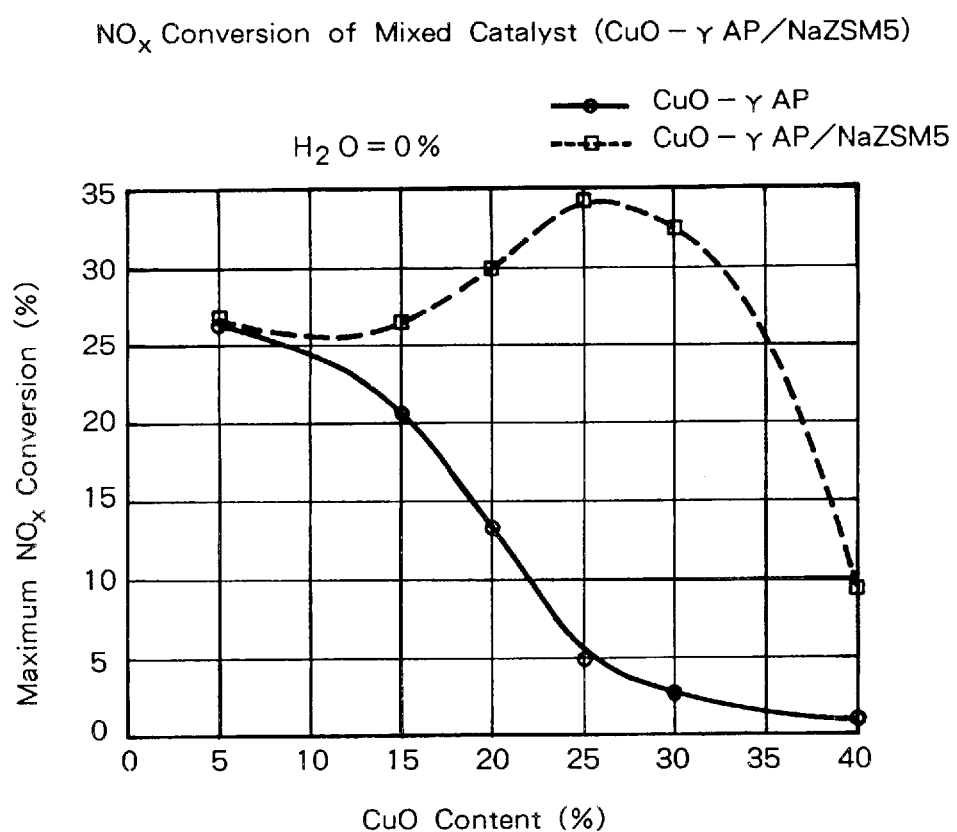
FIG. 8 is a graph showing the conversion of $NO_x$ of catalyst for controlling emissions of Example 6 in case $H_2O$ is 0%.
Figure 9:
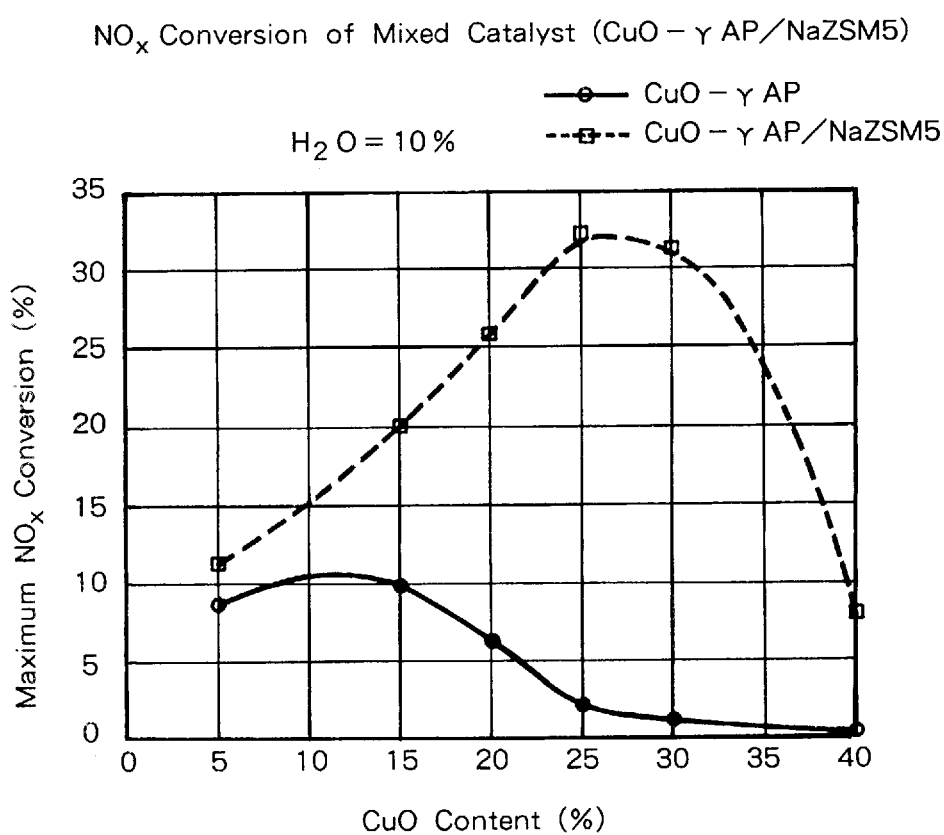
FIG. 9 is a graph showing the conversion of $NO_x$ of catalyst for controlling emissions of Example 6 in case $H_2O$ is 10%.

Table 10 and FIG. 8 and Table 11 and FIG. 9 show the result of the performance test. FIG. 8 shows a data of Table 10 and FIG. 9 that of Table 11 by its graph respectively.

TABLE 10

$NO_x$ Conversion of Mixed Catalyst (CuO-Ap/NaZSM5) at $H_2O$ = 0%

| No. | CuO content (%) | CuO-AP (%) | CuO-AP/NaZSM5 (%) |
| --- | --- | --- | --- |
| 0 | 5.000 | 26.000 | 26.480 |
| 1 | 15.000 | 20.670 | 26.000 |
| 2 | 20.000 | 13.200 | 29.700 |
| 3 | 25.000 | 5.0200 | 34.210 |
| 4 | 30.000 | 2.7000 | 32.600 |
| 5 | 40.000 | 0.88000 | 9.1000 |

TABLE 11

$NO_x$ Conversion of Mixed Catalyst (CuO-AP/NaZSM5) at $H_2O$ = 10%

| No. | CuO content (%) | CuO-AP (%) | CuO-AP/NaZSM5 (%) |
| --- | --- | --- | --- |
| 0 | 5.000 | 8.5100 | 11.210 |
| 1 | 15.000 | 10.020 | 19.900 |
| 2 | 20.000 | 6.4000 | 25.700 |
| 3 | 25.000 | 2.0100 | 32.200 |
| 4 | 30.000 | 1.2000 | 31.200 |
| 5 | 40.000 | 0.32000 | 8.0100 |

(3) Performance Valuation for the mixed catalyst

The test result clearly shows the obtainment of the similar mixture effect to the Example 5.

Example 7

(1) Synthesis of mixed catalyst containing zeolite and hydrothermally treated alumina compound catalyst A solution of mixture of aluminum nitrate and copper nitrate was prepared so as to contain 1 to 50 wt% of copper on the oxide reduction basis. Into the solution, being gently stirred, aqueous ammonia solution diluted to 0.5 to 3% was slowly added until the solution was neutralized to obtain a co-precipitate. Too dense solution and too high speed adding ammonia solution cannot obtain an equal mixture at an atom level. It should be that solution density is under 0.4 mol/l and ammonia solution adding speed is under 10 cc/min (on the basis of 2% ammonia solution value).

The co-precipitate was filtered with purified water to obtain Cu—Al gel, which was hydrothermally treated at the temperature of 150 degree C. using an autoclave. The gel thus treated was dried in the natural air and further dried for a night at 110 degree C. The product was milled using a mortar to obtain powder. The powder was calcined at 700 degree C. for an hour to synthesize hydrothermally treated Cu- alumina compound catalyst (HTS-CuAlO).

The hydrothermally treated alumina compound catalyst and Na type ZSM5 (NaZSM5) are physically mixed in a mortar at a weight ratio 50:50 to obtain a mixed catalyst (HTS-CuAlO/NaZSM5).

(2) Performance Test for the mixed catalyst

A measurement of $NO_x$ Conversion activity was held by a fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (space velocity) being 200,000 $h^{-1}$. No formation of $N_2O$ is recognized.

Figure 10:
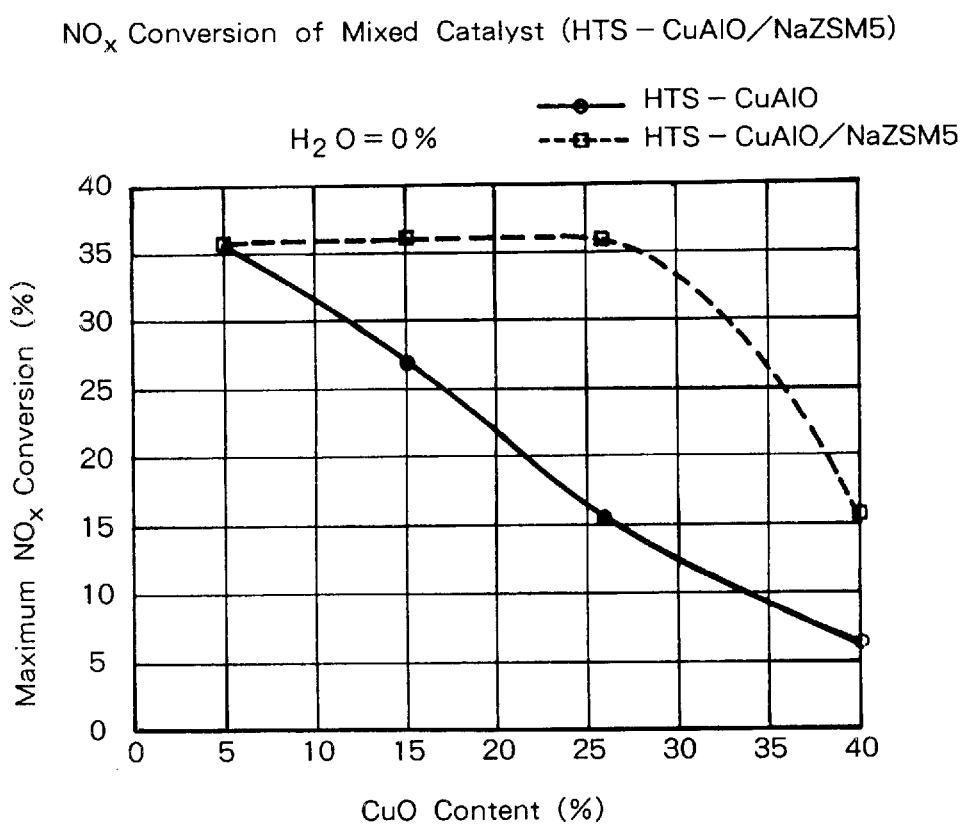
FIG. 10 is a graph showing the conversion of $NO_x$ of catalyst for controlling emissions of Example 7 in case $H_2O$ is 10%.

Table 12 and FIG. 10 show the result of the performance test. FIG. 10 shows a data of Table 12 by its graph.

TABLE 12

$NO_x$ Conversion of Mixed Catalyst (HTS-CuAlO/NaZSM5) at $H_2O$ = 0%

| No. | CoO content (%) | HTS-CuAlO (%) | HTS-CuAlO/NaZSM5 (%) |
| --- | --- | --- | --- |
| 0 | 5.000 | 35.440 | 35.450 |
| 1 | 15.000 | 26.680 | 35.570 |
| 2 | 26.000 | 15.240 | 35.680 |
| 3 | 40.000 | 6.2100 | 15.480 |

(3) Performance Evaluation for the mixed catalyst

The activity of hydrothermally treated Cu-alumina compound catalyst was increased with increasing copper content. However, the activity of zeolite-mixed catalyst did not deteriorate till 26% content of copper. This seems that hydrocarbon activated by zeolite enhances a selective reduction of $NO_x$.

Example 8

(1) Synthesis of mixed catalyst containing zeolite and Co-alumina compound catalyst Under the same method mentioned in Example 6 except using cobalt nitrate instead of aluminum nitrate Co-alumina compound catalyst was prepared and mixed with zeolite at a weight ratio 50:50 to obtain a mixed catalyst (CoAlO/NaZSM5).

(2) Performance Test for the mixed catalyst

A measurement of $NO_x$ conversion was held by a fixed-bed flow system under atmospheric pressure, with the reaction gas having a composition comprising NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (space velocity) being 200,000 $h^-$. No formation of $N_2O$ is recognized.

Figure 11:
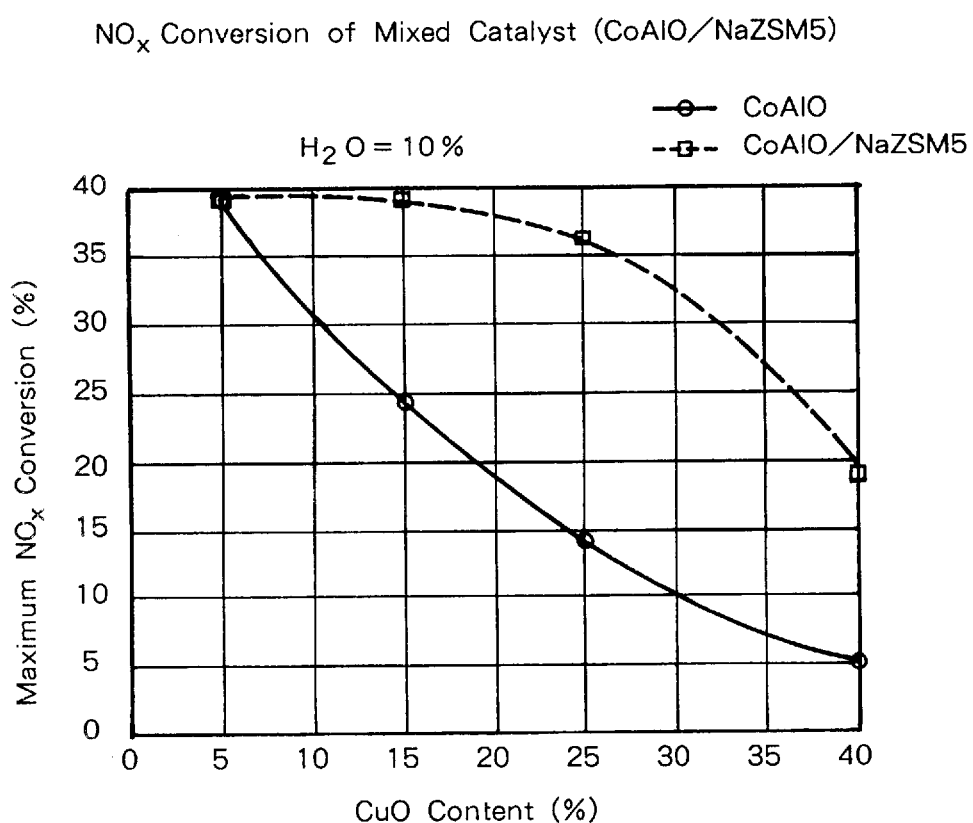
FIG. 11 is a graph showing the conversion of $NO_x$ of catalyst for controlling emissions of Example 8 in case $H_2O$ is 10%.

Table 13 and FIG. 11 show the result of the performance test. FIG. 11 shows a data of Table 13 by its graph.

TABLE 13

$NO_x$ Conversion of Mixed Catalyst (CoAlO/NaZSM5) at $H_2O$ = 10%

| No. | Co content (%) | CoAlO (%) | CoAlO/NaZSM5 (%) |
| --- | --- | --- | --- |
| 0 | 5.000 | 38.2 | 38.12 |
| 1 | 15.000 | 24.5 | 37.98 |
| 2 | 26.000 | 14.3 | 37.12 |
| 3 | 40.000 | 5.2 | 18.54 |

(3) Performance Evaluation for the mixed catalyst

The test result clearly shows that the mixture with zeolite increases more $NO_x$ conversion activity.

Example 9

Performance test was held how zeolite mixture amount in the mixed catalyst (CuAlO/NaZSM5) affects $NO_x$ conversion of the mixed catalyst.

A measurement of $NO_x$ conversion activity was held by a reaction apparatus with fixed floor normal pressure circulation system at a composition of reaction gas being NO: 1000 ppm, $C_3H_6$: 1000 ppm, CO: 1200 ppm, $H_2$: 400 ppm, $O_2$: 6%, $CO_2$: 10%, $H_2O$: 10%, $N_2$: Bal and GHSV (space velocity) being 200,000 $h^{-1}$. No formation of $N_2O$ is recognized.

Figure 12:
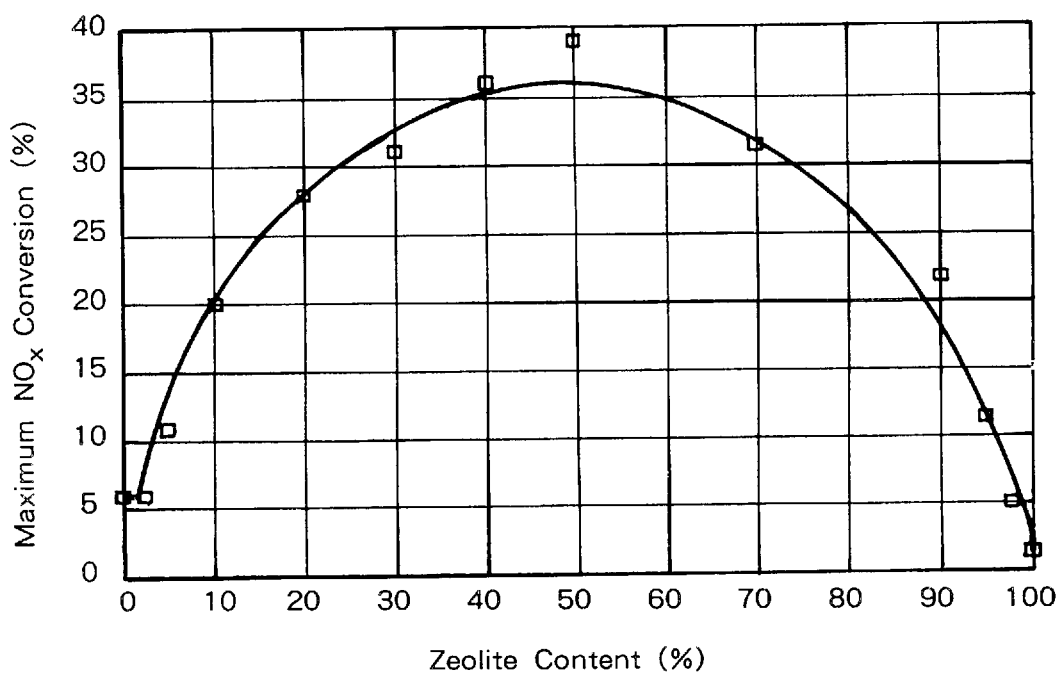
FIG. 12 is a graph showing the conversion of $NO_x$ of catalyst for controlling emissions of various mixing ratio of zeolite.

Table 14 and FIG. 12 show the result of the performance test. FIG. 12 shows a data of Table 14 by its graph.

TABLE 14

$NO_x$ Conversion of Mixed Catalyst (CuAlO/NaZMS5) in dependence of Content of Zeolite

| No. | Zeolite content (wt %) | $NO_x$ Maxim. Conversion (%) |
|---|---|---|
| 0 | 0 | 6.34 |
| 1 | 2.5 | 6.34 |
| 2 | 5.0 | 11.2 |
| 3 | 10.0 | 19.8 |
| 4 | 20.0 | 28.4 |
| 5 | 30.0 | 31.5 |
| 6 | 40.0 | 36.52 |
| 7 | 50.0 | 38.77 |
| 8 | 70.0 | 32.61 |
| 9 | 90.0 | 22.16 |
| 10 | 95.0 | 12.04 |
| 11 | 97.5 | 5.04 |
| 12 | 100 | 2.51 |

The test result shows that $NO_x$ conversion activity of the mixed catalyst (CuAlO/NaZSM5) are noticed within the scope between over 5 wt% and 95 wt % of zeolite mixture amount.

Example 10

Figure 13:
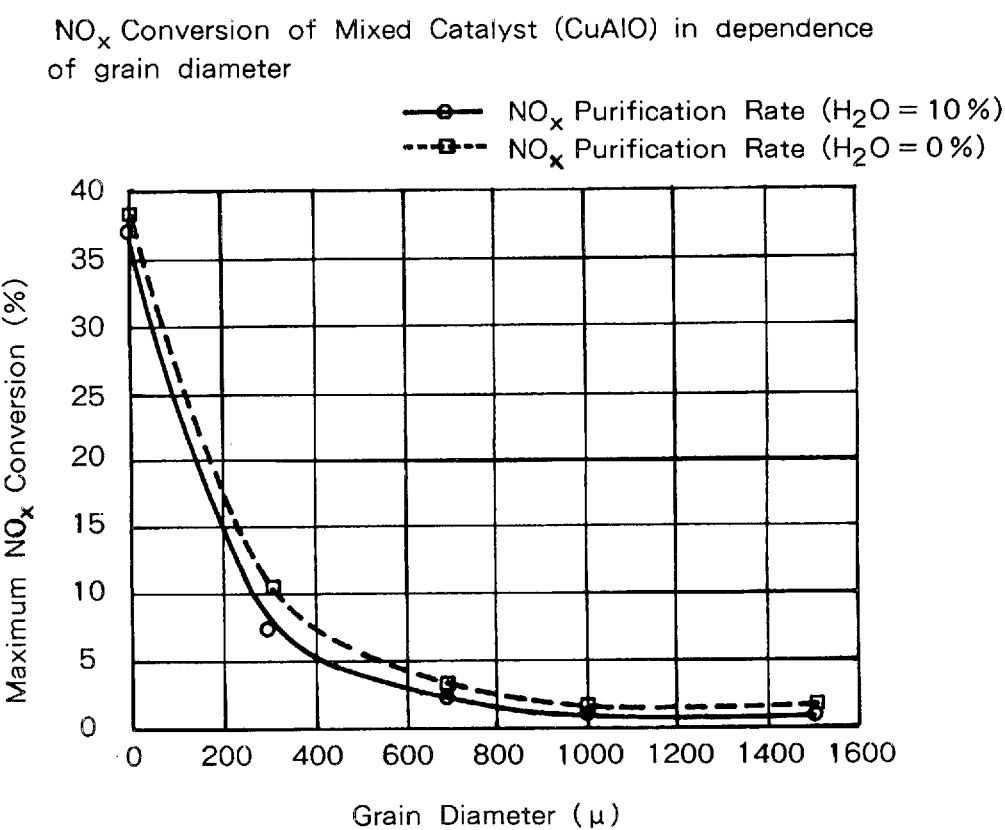
FIG. 13 is a graph showing the conversion of $NO_x$ of catalyst for controlling emissions of various grain diameter.

A measurement of a grain diameter depending on $NO_x$ conversion activity was held by mixtures separately pelletted in suitable sizes with aluminum compound catalyst (CuAlO) and NaZSM5. Table 15 and FIG. 13 show the result of the measurement. FIG. 13 shows a data of Table 15 by its graph. The grain diameter is resultantly required to be less than 1 mm.

TABLE 15

$NO_x$ Conversion of Mixed Catalyst (CuAlO) in dependence of grain diameter

| No. | Grain diameter (micro meter) | $NO_x$ Maxim. Conversion ($H_2O$ = 10%) | $NO_x$ Maxim Conversion ($H_2O$ = 0%) |
|---|---|---|---|
| 0 | 1.0000 | 37.300% | 38.800% |
| 1 | 350.00 | 7.5000% | 10.300% |
| 2 | 700.00 | 2.2000% | 3.2000% |
| 3 | 1000.0 | 0.84000% | 1.9000% |
| 4 | 1500.0 | 0.84000% | 1.5600% |

Example 11

Figure 14:
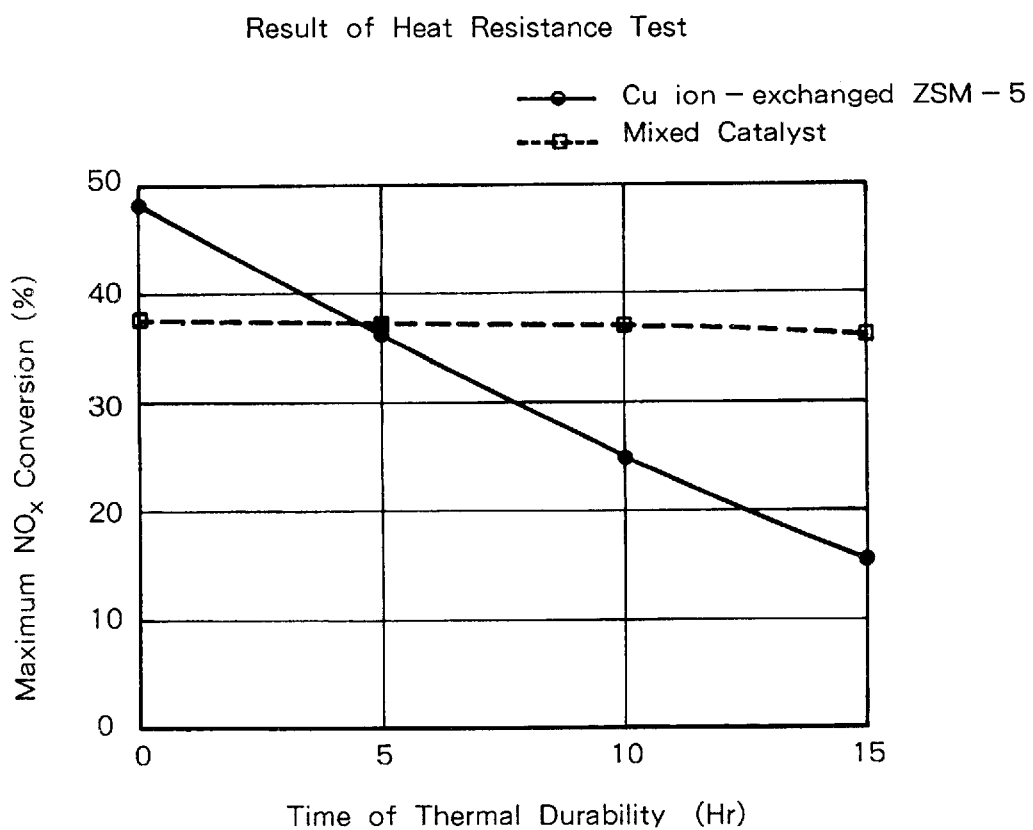
FIG. 14 is a graph showing the performance for heat resistance of mixed catalyst.

Heat resistance test for mixed catalyst (CuAlO/NaZSM5) and copper ion exchanged ZSM5 (exchange ratio 100%) was held at 800 degree C. for 15 hours in reaction gas at its composition being NO: 1000 ppm, $C_3H_6$: 1000 ppm, CO: 1200 ppm, $H_2$: 400 ppm, O2: 6%, $CO_2$: 10%, $H_2O$: 10%, $N_2$: Bal and GHSV (space velocity) being 200,000 $h^{-1}$. No formation of $N_2O$ is recognized. Table 16 and FIG. 14 show the result of the test. FIG. 14 shows a data of Table 16 by its graph.

TABLE 16

Result of Heat Resistance Test

| No. | Time of Thermal Resistance Test | Cu ion-exchanged ZMS-5 | Mixed Catalyst (CuAlO/NaZSM5) |
|---|---|---|---|
| 0 | 0.0000 | 48.000 | 37.250 |
| 1 | 5.0000 | 36.100 | 37.100 |
| 2 | 10.000 | 25.200 | 36.900 |
| 3 | 15.000 | 15.400 | 36.100 |

The test result shows that no deterioration of heat resistance in the mixed catalyst (CuAlO/NaZSM5) is recognized.

What is claimed is:

1. A method for producing a hydrothermally treated emission catalyst comprising the steps of:

preparing a solution comprising: a soluble transition metal and a soluble salt having an element therein selected from the group consisting of: Al and Si;

co-precipitating said transition metal and said soluble salt, so as to form a gel;

autoclaving said gel;

drying said gel, so as to form a powder; and calcining said powder so as to form said hydrothermally treated emission catalyst, said catalyst having a surface and a grain diameter.

2. The method of claim 1 wherein said transition metal and said soluble salt are present as a compound oxide.

3. The method of claim 2 wherein said transition metal is dispersed within said soluble salt such that said transition metal forms a part of the surface.

4. The method of claim 2 wherein said transition metal is coordinated to a distance of less than 2.5 Angstroms by atoms selected from the group consisting of: O, Al and Si.

5. The method of claim 1 wherein autoclaving occurs below a critical temperature, the critical temperature being a temperature at which said compound oxide separates into transition metal oxide and soluble salt oxide.

6. The method of claim 5 wherein the critical temperature is less than 200° C.

7. The method of claim 5 wherein the critical temperature is less than 190° C.

8. The method of claim 1 wherein autoclaving occurs in the presence of a solvent selected from the group consisting of: water and alcohol.

9. The method of claim 1 wherein said catalyst comprises said transition metal and is an oxide selected from the group consisting of: alumina and silica, said transition metal and said oxide mixed with a zeolite.

10. The method of claim 9 wherein said transition metal forms a part of the surface of said catalyst.

11. The method of claim 10 wherein the grain diameter of said oxide catalyst is less than 1 mm.

12. The method of claim 9 wherein said zeolite is 5 to 95 wt. % of said catalyst.

13. The method of claim 1 wherein said transition metal is 15 to 45 wt. % of said catalyst.

* * * * *